Oct. 28, 1958          G. A. BLEYLE, JR          2,858,146
COUPLING MEANS FOR LIQUIFIED-GAS CONDUITS
Filed Feb. 2, 1956          3 Sheets-Sheet 1

INVENTOR:
Gustave A. Bleyle, Jr.
BY

*Roland A. Anderson*

Attorney

Oct. 28, 1958   G. A. BLEYLE, JR   2,858,146
COUPLING MEANS FOR LIQUIFIED-GAS CONDUITS
Filed Feb. 2, 1956   3 Sheets-Sheet 2

INVENTOR:
Gustave A. Bleyle, Jr.
BY
Attorney

INVENTOR:
Gustave A. Bleyle, Jr.
BY

Attorney

United States Patent Office 2,858,146
Patented Oct. 28, 1958

2,858,146

COUPLING MEANS FOR LIQUIFIED-GAS CONDUITS

Gustave A. Bleyle, Jr., Melrose, Mass., assignor, by mesne assignments, to the United States of America as represented by the United States Atomic Energy Commission Application February 2, 1956, Serial No. 563,166

7 Claims. (Cl. 284—18)

The present invention relates generally to conduits for conducting cold fluids such as liquefied gases and more particularly to vacuum-insulated conduits and means for readily connecting and disconnecting lengths thereof.

It is frequently desired to transfer liquefied gases, for example, liquid oxygen at a temperature of about 300 degrees below zero Fahrenheit, between containers or from liquefying apparatus to a container. Conduits or fittings generally employed for this purpose are of the double-walled or coaxial tube type, the space between inner and outer tubes being evacuated and the liquid flowing through the innermost tube. If containers were always separated by some short distance, a single length of conduit could be utilized; however, this is not usually the case. Separation distances may be so great as to make utilization of a single length of conduit objectionable; even through liquefaction apparatus and a container may be close to each other, it is still desirable to provide means for readily disconnecting from each other, or connecting with each other, portions of an interconnecting conduit or fitting.

The present invention aims to provide relatively sturdy and foolproof means for readily connecting and disconnecting conduit lengths, which is adapted to minimize heat leakage from the atmosphere to liquid within the conduit, which facilitates connection and disconnection of conduit lengths without requiring emptying liquid from the entire conduit length, and which minimizes liquid spillage during the connecting or disconnecting operations.

An object of the present invention is to provide new and improved means for connecting and disconnecting lengths of conduit.

Another object of the invention is to provide improved conduit connecting means which facilitates evacuation of gases from a conduit prior to admission of liquid thereto.

Another object of the invention is to provide improved conduit connecting and disconecting means which minimizes heat leakage from the adjacent atmosphere to the interior of the conduit.

Still another object of the invention is to provide improved conduit coupling means adapted to minimize liquid losses during connecting and disconnecting operations.

A further object of the invention is to provide new and improved coupling means which is of relatively simple, sturdy and foolproof construction.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings.

Figure 1:
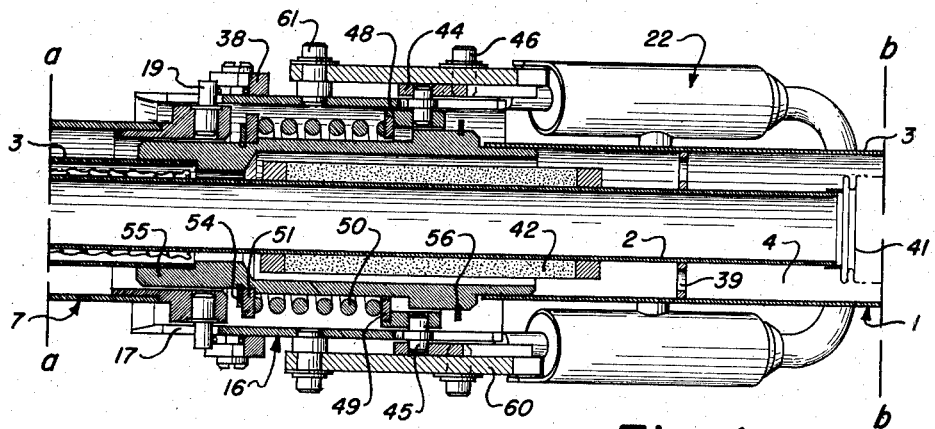
Fig. 1 is a fragmentary view, taken along line 1—1 of Fig. 2, showing a preferred embodiment of the coupling means of the present invention, with the parts in a final coupled relationship.
Figure 2:
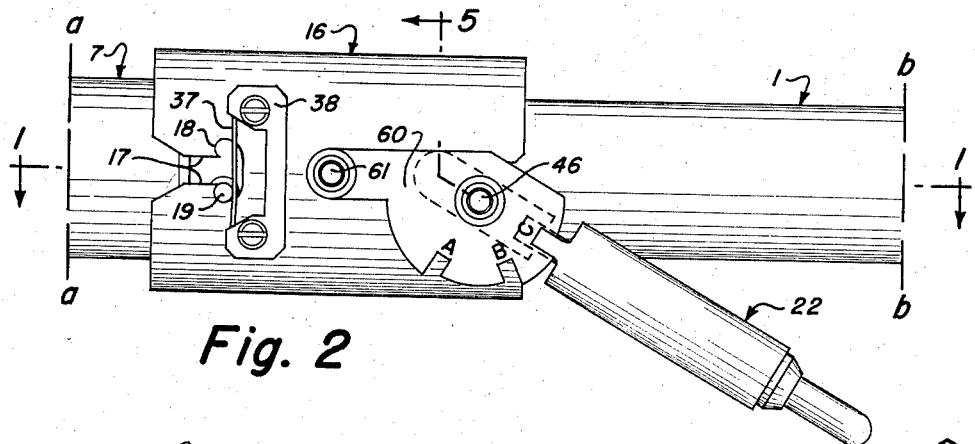
Fig. 2 is an elevational view of the portion of the device shown in Fig. 1.
Figure 2A:
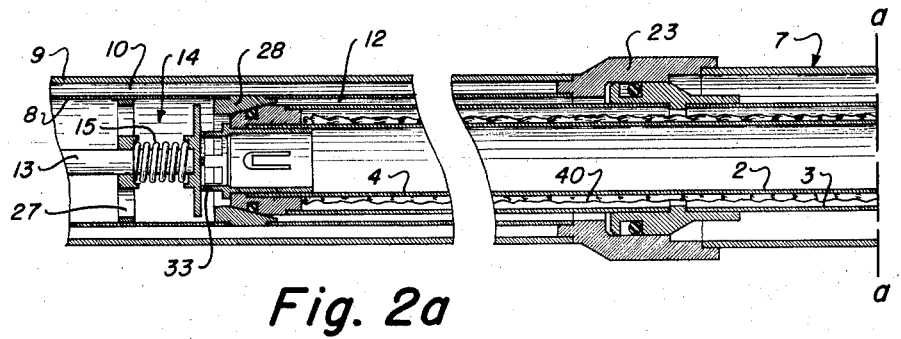
Fig. 2a is a fragmentary longitudinal sectional view showing the portion of the invention that is located at the left of the line a—a of Figs. 1 and 2.
Figure 3A:
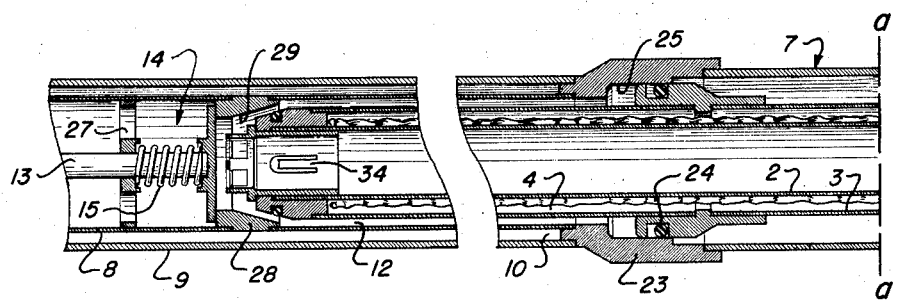
Fig. 3a is a fragmentary longitudinal sectional view showing the portion of the invention that is located at the left of the line a—a of Figs. 1 and 2, but with the parts in the relationship obtained when the controlling handle is positioned as in Fig. 3.
Figure 2B:
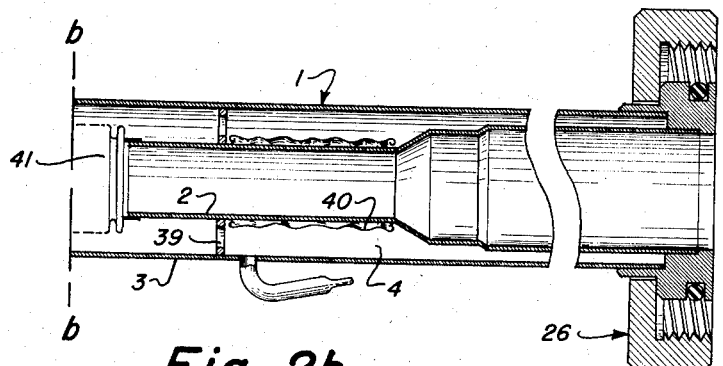
Fig. 2b is a fragmentary longitudinal sectional view showing the portion of the invention that is located to the right of the line b—b of Figs. 1 and 2.

Due to the elongated nature of the device, portions of it have been shown in separate views, but it will be clear that the portion shown in Fig. 2b is joined along line b—b with the portion shown in Figs. 1 and 2, and that the portion shown in Fig. 2a is joined along line a—a with the portion shown in Figs. 1 and 2.

Described generally, the present apparatus or device comprises a conduit 1, having inner and outer tubes 2 and 3 separated by an evacuated heat-insulating space 4, which has an end portion extending into an additional conduit or conduit section 7. The conduit section 7 also has inner and outer tubes 8 and 9 separated by an evacuated heat-insulating space 10. The "outer" conduit section 7 contains within its inner tube 8 a check valve 14 for closing it against fluid flow in one direction, but which may be engaged and opened by an actuating end of the "inner" conduit 1.

The two conduits 1 and 7 are releasably retained together by what may be termed a support member or collar or sleeve member 16, which carries or supports the conduit 1 and is provided with slots 17 and associated apertures 18 for receiving and retaining locking pins 19 of the outer conduit section 7.

Figures 3, 4:
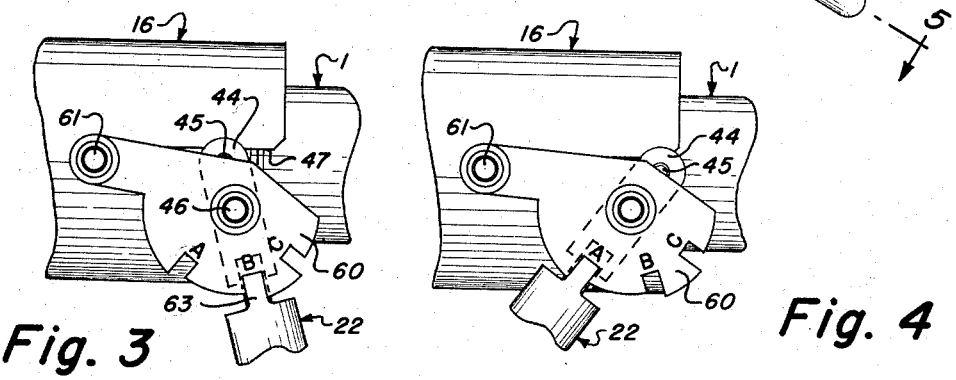
Fig. 3 is a fragmentary elevational view similar to that of Fig. 2 but showing a controlling handle and retaining means in an intermediate position.
Fig. 4 is a fragmentary elevational view generally similar to that of Fig. 2 but showing an operating lever and latch mechanism in an initial or preliminary position.
Figure 4A:
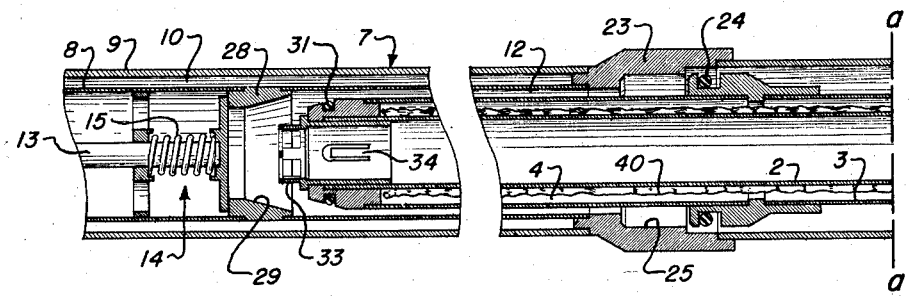
Fig. 4a is a fragmentary longitudinal sectional view showing the portion of the invention that is located at the left of the line a—a of Figs. 1 and 2, but with the parts in the relationship obtained when the controlling handle is positioned as in Fig. 4.

With the conduits attached together as in Figs. 1 and 2, the conduit 1 may be moved longitudinally toward or away from the check valve 14 by swinging a control handle 22 through the different positions indicated by the reference characters A, B, C of Figs. 2, 3 and 4. Figs. 4 and 4a show the initial position of handle 22 and conduits, prior to engagement of sealing means or seating portions shown as rings or gaskets 24 and 31 of conduit 1 with corresponding seats 25 and 29 of the conduit 7.

When handle member 22 is shifted from initial position A to the intermediate position B of Fig. 3, the conduit 1 moves toward the check valve 14 of conduit 7 and the "rearward" sealing ring 24 engages the seat 25 of conduit 7. In this relationship air or other gases may be withdrawn, by suitable pumping equipment connected with the coupling means 26 shown at the right end of Fig. 2b, from the interior of inner tube 2 and from the annular space 12 between outer tube 3 and inner tube 8 of conduit section 7. In addition to minimizing heat leakage by removal of air from this annular space, there are also removed constituent gases of the air and, even more important, moisture which may condense and freeze and thereby render difficult or impossible separation of the conduits after liquid transferring operations. It will be noted that in the intermediate or B position, check valve 14 is closed against escape of liquid which may be in conduit 7.

Subsequent to evacuation of air and moisture from conduit section 7 and the annular space 12, handle 22 may be shifted to the final C position of Figs. 1 and 2. In this relationship "rear" and "front" seals are formed between sealing or O rings 24, 31 and complementary sealing surfaces of outer conduit 7, thus isolating the annular chamber 12 between the tubes 3 and 8, and the disc of check valve 14 is lifted from its seat in opposition to the check valve spring 15. With check valve 14 open, liquefied gas may flow around the periphery of the sealing disc, through cut-outs in the lifting element or plug 33 adjacent the end of conduit 1, and thence through the inner tube 2 to a desired location or container.

Described in greater detail, conduit section 7 comprises inner and outer tubes, of any suitable construction diameters and lengths, and an annular member 23 having at its interior the sealing seat or surface 25. For heat insulating purposes the space between inner and outer tubes is evacuated and then sealed off. The annular member 23 may be welded or brazed onto ends of appropriate lengths of tubing and may be either a single piece or a pair of elements (not shown) threaded together. A spider member 27 carried by the inner tube 8 supports the check valve shaft 13 and check valve spring 15 urges the valve closure element or disc toward and into engagement with an adjacent seat on the tapered sealing element 28. Pressure exerted by gas or liquid contained within the conduit section 7 assists in holding the valve firmly on its seat.

The conduit section 7 may be provided with suitable coupling means (not shown) at its remote end or may comprise an outlet fitting of relatively short length which is secured at its remote end to the discharge side of liquefaction equipment. Adjacent its illustrated terminal end it is provided with circumferentially spaced retaining pins 19 for holding it together with the other conduit 1.

Collar or support member 16 carries the conduit 1 and is provided with circumferentially spaced slots 17 and apertures 18 for receiving the retaining pins 19 on the conduit section 7. As already referred to in the general description, conduit 1 includes a pair of tubes separated by an annular sealed off, heat insulating, evacuated space; the tubes are held apart by suitable spacers 39, are radiation shielded by foil layers 40, provided with bellows 41 to accommodate expansion and contraction, and the evacuated space may contain an adsorbent trap 42. With the handle 22 disposed in the initial position of Fig. 4, the reduced diameter or left end of conduit 1 may be inserted into conduit section 7 so that the retaining pins 19 enter and pass to the bottoms of slots 17; support member 16 and its conduit 1 may be then rotated circumferentially, in either direction, to seat the pins 19 in the sockets 18. Pin-retaining springs 37 carried by blocks 38 bolted to the member 16 press against the pins 19 and minimize accidental or unintentional movement of the pins out of their end sockets 18.

When the controlling lever or handle 22 is disposed in the initial position of Fig. 4, the end of the inner or reduced conduit 1 is spaced from check valve 14 and from the tapered seat element as indicated in Fig. 4a. Sealing ring 24 is out of engagement with the seating surface 25 of annular member 23. The conduits and parts are aligned for movement of the actuating handle 22 to the intermediate B position of Fig. 3.

As the handle 22 is rotated toward intermediate position B, the check valve 14 and terminal end of inner conduit 1 are caused to approach each other, by an operating mechanism which will be later described, and sealing ring 24 engages the sealing surface 25 of annular member 23. In this intermediate position valve-actuating element 33 is spaced from the check valve 14 and the sealing member which carries sealing ring 31 is spaced from the seat 29 of complementary seating element 28, so that evacuation of gases from inner tube 2 simultaneously evacuates the annular space 12 between outer and inner tubes 3 and 8.

After satisfactory evacuation of gases and entrained moisture or vapor from the inner tube of conduit 1 and from the annular space 12, the control handle 22 may be swung to the final position C of Figs. 1 and 2. As the handle is swung toward this final position, sealing ring 24 slides along the sealing surface 25 to maintain the established vacuum and sealing ring 31 comes into engagement with the sealing surface 29 on the sealing element 28 so as to seal off the evacuated annular space 12 between the two spaced sealing rings or gaskets and thereby minimize heat leakage from the atmosphere and obviate the possibility of the tube walls forming the annular chamber 12 freezing together. Shortly after the sealing ring 31 first engages sealing surface 29, actuating member 33 engages the closure disc of check valve 14 and lifts it from its seat so that liquid may flow from conduit section 7 around the check valve, through peripheral openings in the element 33, into conduit 1. Plug 33 may be frictionally retained in the end of conduit 1 by means of spring fingers 34 which engage the inner surface of tube 2. The check valve disc may be provided with any suitable facing material for forming a firm seat against sealing element 28, e. g., neoprene or other appropriate materials.

Longitudinal movement of the conduits 1 and 7 toward or away from each other is obtained by movement of the control lever or handle 22 through the intermediation of links 44 which form a continuation of handle 22 and are rotatable about pins 46 of a plate member 60, pins 45 which travel along slots 47, ring 48 at the inside of collar or support member 16, spring seat washer 49, compression spring 50, spring seat washer 51, retaining ring 54, and tubular member 55, to which are secured outer tubing sections 3 of the conduit 1. A retaining ring 56 limits movement of the supporting ring along tubular member 55.

The spring 50 intermediate the supporting ring 48 and conduit 1 permits the sealing ring 31 and associated sealing surfaces adjacent the terminal end of conduit 1 to engage prior to the handle 22 reaching its final position C, so that movement of the handle member through its last increment may partially compress the spring 50 and urge the terminal sealing surfaces into firm interengagement. The spring 50 insures maintenance of tight seals when various elements of the coupling means are subjected to cooling and shrinkage.

Figure 5:
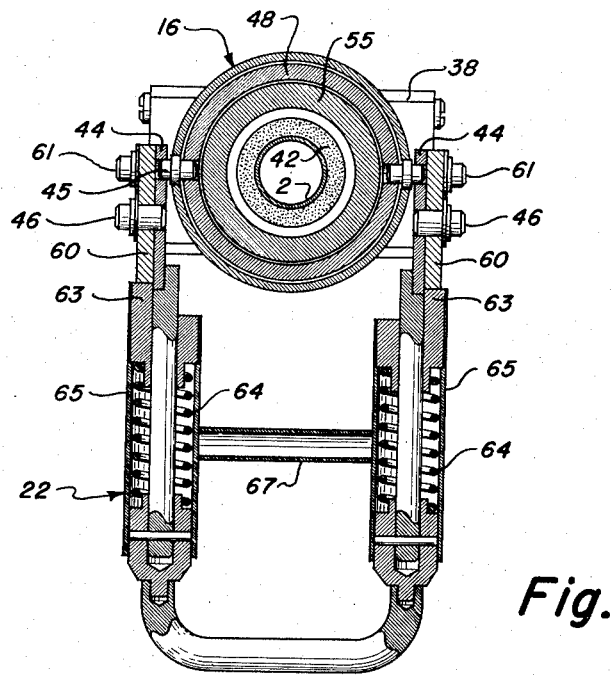
Fig. 5 is a transverse sectional view taken generally along line 5—5 of Fig. 2.

The controlling handle 22 may be retained in initial, intermediate, or final position by latch means comprising notched plate members 60 rotatably secured to opposite sides of the collar or support member 16 by pins 61. The angularly spaced notches of the plate members 60 receive the ends of latch members 63, which are normally urged toward the plate members by springs 64 housed within sleeves 65 (Fig. 5). The ends of latch members 63 may be withdrawn from recesses of the plate members 60 by pulling outwardly on an interconnecting crossbar 67, thereby correspondingly move the sleeves 65 and integral latch members 63. When clear of the walls forming the plate notches, the handle member 22 may be rotated to align the latch members with desired notches.

Rotatably or pivotally mounting the plate member 60 on pin 61 permits swinging thereof about pin 61 so that the pin 45 of link member 44, which is rotatably secured to plate 60 by pin 46, may travel along the guide slot 47.

The coupling means 26 shown at right end of the device (Fig. 2b) may be threaded together with complementary elements (not shown) of another conduit, container, or apparatus. The coupling represents but one of many different types which may be employed; in some instances it may be preferred to join the coupling means directly to a vessel from which liquid is to flow.

It will be seen that the present invention provides rugged and relatively foolproof means for readily connecting and disconnecting lengths of vacuum-insulated conduit. The conduits may be composed of any suitable materials and may be constructed in various sizes. The device facilitates evacuation of gases from a conduit itself as well as from the annular space surrounding the conduit prior to passage of liquefied gases through the conduits. Removal of these gases minimizes heat transfer from surrounding atmosphere and also removes moisture which is subject to condensation and freezing, with consequent freezing together of the conduit so as to render impossible or difficult their disengagement, subsequent to completion of liquid transfer operations. The quick-disconnect means employed first insures alignment of the conduits with each, then forms a seal between conduit sections such that air or other gases may be evacuated, and finally closes off the thus evacuated spaces and opens a check valve for flow of liquefied gases through the connected conduits.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. Apparatus of the character described comprising the combination of a collar member, a conduit encircled by the collar member, a first sealing means carried by the conduit at a location spaced from one end thereof, supporting means movably supporting the conduit in the collar member, an additional sealing means carried by the conduit at a location adjacent said conduit end, a conduit section secured to said collar member and containing a portion of said conduit and having a pair of spaced apart seats with the spacing therebetween corresponding generally to the spacing between said sealing means to engage said first and additional sealing means respectively of the conduit, and means including a lever member carried by the collar member and connected with the supporting means for effecting movement of the conduit to selectively engage and disengage said sealing means and seats.

2. Apparatus as claimed in claim 1 in which the conduit section has therein a check valve and seat therefor for preventing fluid flow through the conduit section, and the conduit carries adjacent its end means aligned with the check valve to open the check valve in response to conduit longitudinal movement toward the check valve.

3. A device of the character described comprising the combination of a support member including means for connection with a conduit section, an elongated conduit encircled by the support member, support means movably supporting the conduit in the support member, first and additional seating portions carried by the conduit at spaced apart locations to engage spaced apart seats of a said conduit section, and actuating means carried by the support member and connected with the support means for longitudinally moving the conduit and the seating portions carried thereby to engage and disengage said seating portions with said seats of a said conduit section.

4. A device as claimed in claim 3, in which means is provided for retaining said actuating means in one of a plurality of selected positions to thereby retain the conduit and the seating portions carried thereby in corresponding selected positions.

5. A device as claimed in claim 3, in which yieldable means is provided intermediate said conduit and actuating means adapted to urge the conduit in one direction.

6. A device as claimed in claim 3, in which a portion of the conduit has an outer diameter less than an inner diameter of a said conduit section, and said seating portions are located at the exterior of the conduit and include compressible sealing rings.

7. A device as claimed in claim 3, in which one of said seating portions is located adjacent a terminal end of the conduit and has an outside diameter less than that of the other, whereby it may pass through a seat of a said conduit section which is adapted to engage said other seating portion.

References Cited in the file of this patent

UNITED STATES PATENTS

| | | |
|---|---|---|
| 2,413,571 | Krone et al. | Dec. 31, 1946 |
| 2,441,363 | Krueger | May 11, 1948 |